Feb. 8, 1966  J. E. VAUGHAN  3,233,875
PROCESSING OF MIXING AND STORING LIQUID MANURE
Original Filed April 23, 1962  5 Sheets-Sheet 1
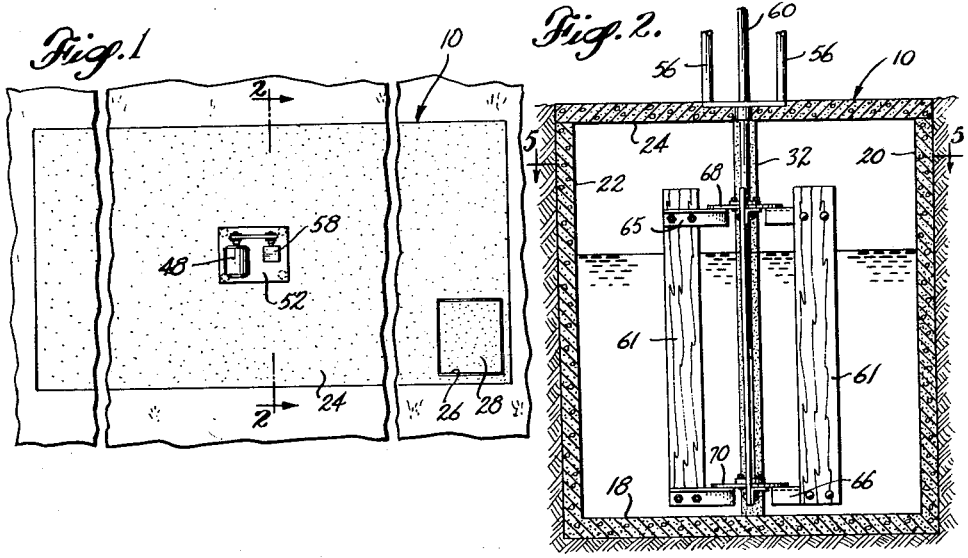
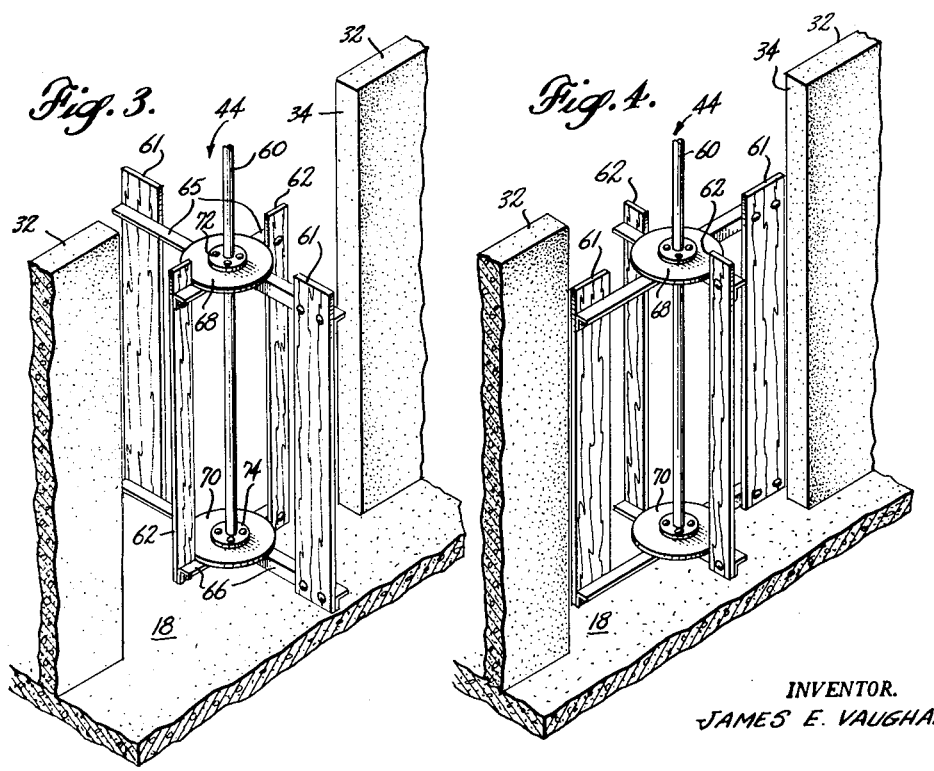
INVENTOR.
JAMES E. VAUGHAN

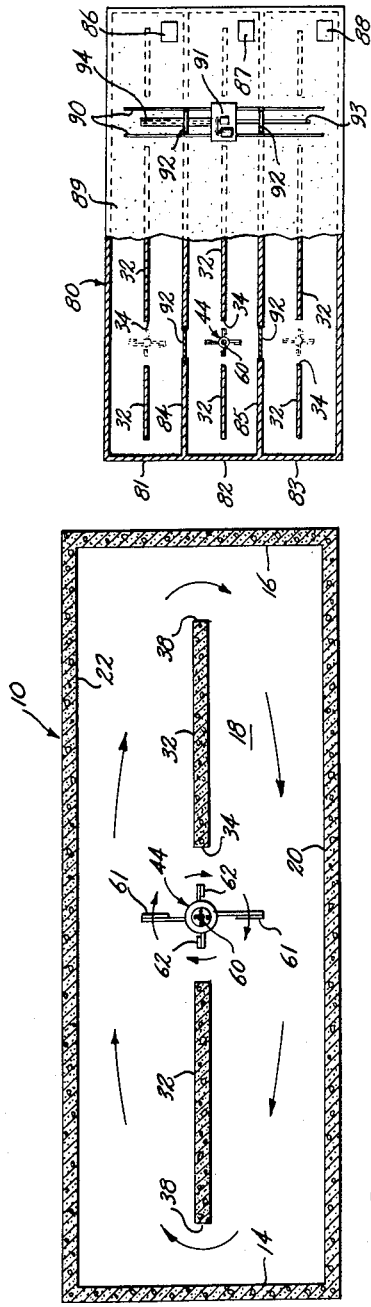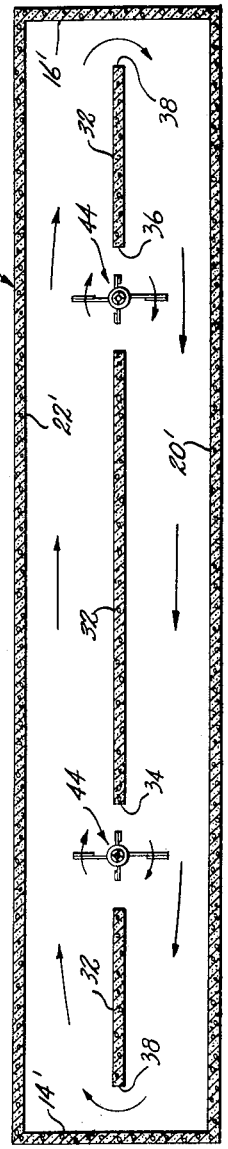

Feb. 8, 1966   J. E. VAUGHAN   3,233,875
PROCESSING OF MIXING AND STORING LIQUID MANURE
Original Filed April 23, 1962   5 Sheets-Sheet 3
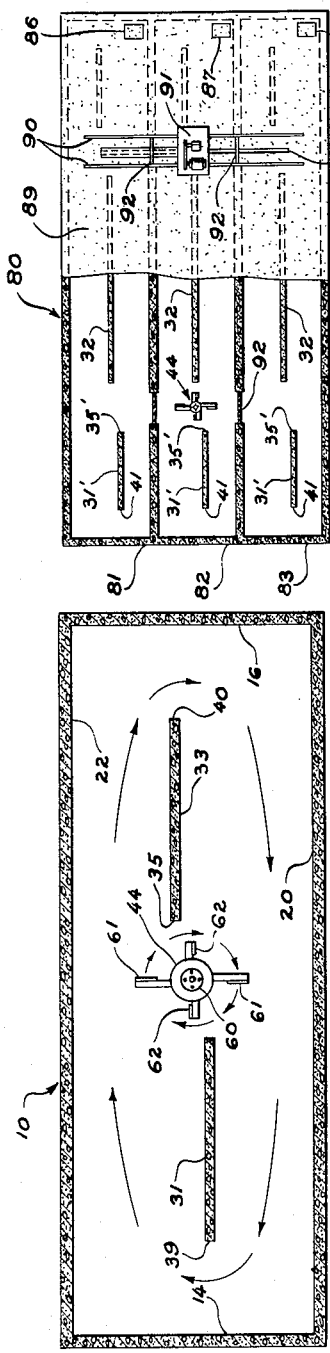
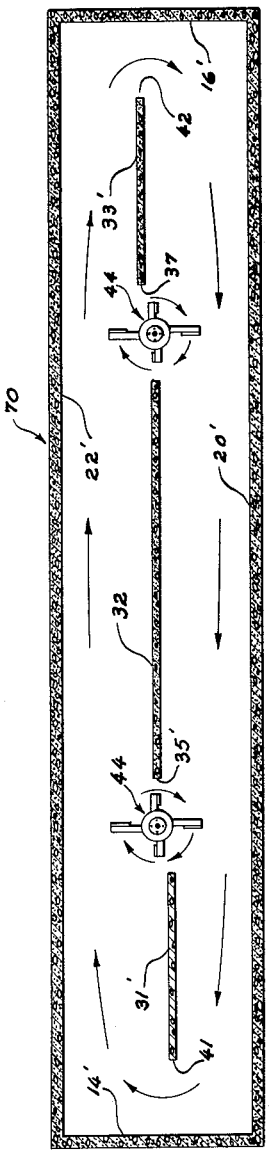
INVENTOR.
JAMES E. VAUGHAN

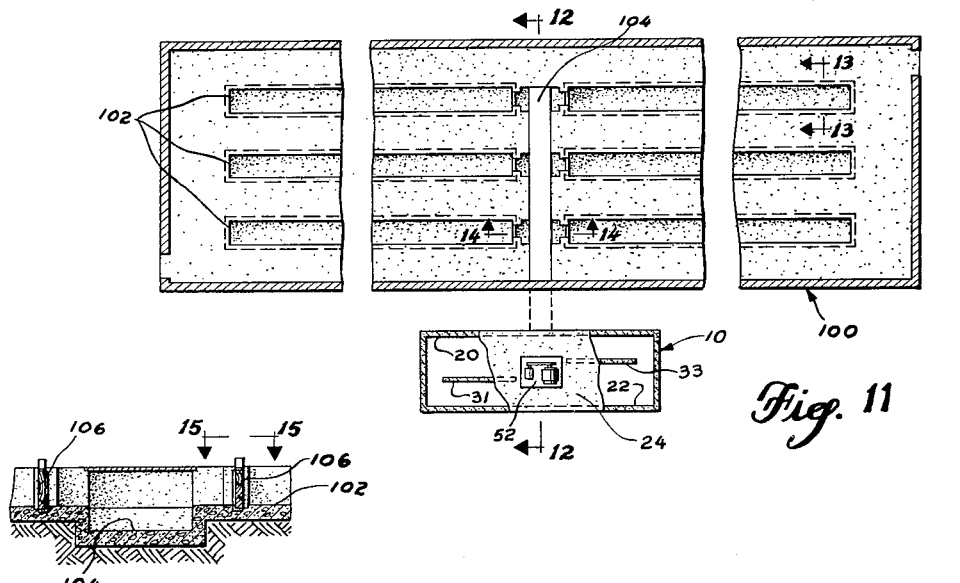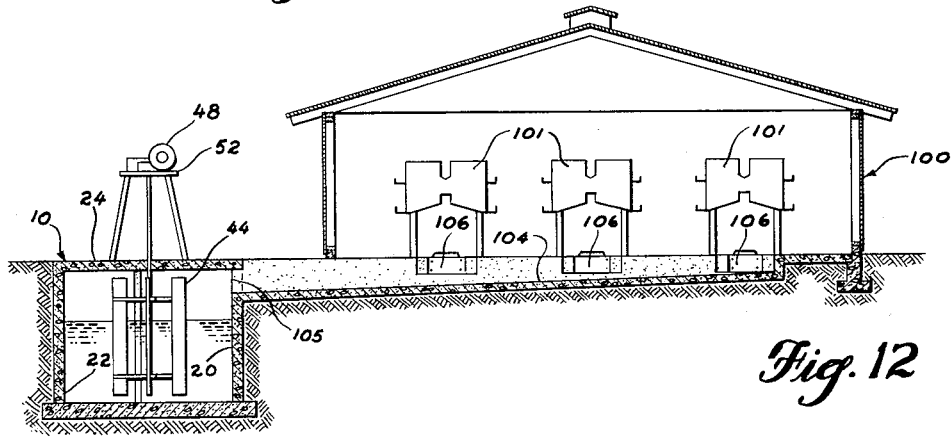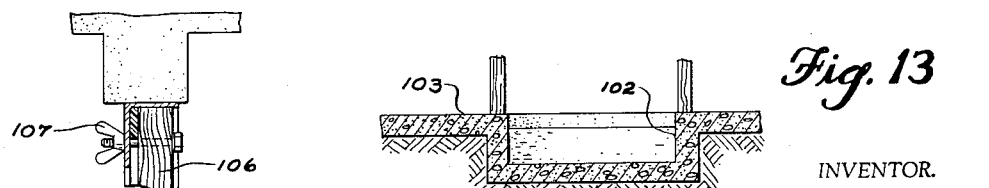

United States Patent Office 3,233,875
Patented Feb. 8, 1966

3,233,875
PROCESSING OF MIXING AND STORING
LIQUID MANURE
James E. Vaughan, Elma, Wash., assignor to
Vaughan Co., Inc., Montesano, Wash.
Original application Apr. 23, 1962, Ser. No. 189,619.
Divided and this application June 15, 1964, Ser.
No. 375,065
2 Claims. (Cl. 259—95)

This application is a division of my application Serial No. 189,619, filed April 23, 1962, now Patent No. 3,155,375, which is a continuation-in-part of my previous application Serial No. 2,023, filed January 12, 1960, for Liquid Fertilizer Mixing and Storage Tank, now abandoned, which in turn is a continuation-in-part of my previous application Serial No. 695,695, filed November 12, 1957, for Process and Apparatus for Preparing Liquid Fertilizer, now abandoned.

This invention relates to process for facilitating the collection of manure from farm animals and poultry, conveying such manure to storage facilities and storing the manure in a condition in which it is readily useable for fertilizing land.

It is a principal object to provide a process for collecting and handling farm manure of various types in liquid form. Such manure may be from cows, horses, pigs, sheep, chickens, turkeys or other farm animals or fowl. When properly collected and stored to provide and maintain substantial homogeneity, farm manure in liquid form used as fertilizer can be transported by tank truck and applied to farm land by spray or subsurface injection methods. Such fertilizer is quickly assimilated by the soil and is in the most effective condition for use by vegetation. It is important that such fertilizer be substantially homogeneous so that the soil will be treated uniformly and, consequently, will promote uniform vegetation growth.

Liquid manure fertilizer includes both urine and solid excreta and may be diluted with water, as desired, or fortified with soluble or suspendible fertilizers of other types.

Manure of both liquid and solid types can flow, be washed or scraped from a feeding platform, holding pen, or other receiving surface into a storage tank which preferably is located underground. In such a tank the fertilizer can be mixed initially and stirred periodically to obtain and maintain substantial homogeneity and can be pumped from such a tank, such as into a tank truck, by which it can be transported to a location where it is to be used as fertilizer.

In the storage tank the various ingredients of the liquid manure will be subjected to a thorough and uniform mixing operation which will not churn the liquid but will be sufficiently vigorous to avoid sedimentation and the collection of scum on the liquid. The mixing must be uniform not only to provide homogeneity but to prevent the occurrence of stagnant areas where sedimentation or scum formation or stratification might develop. The mixing must, therefore, also effect uniformity from the top to the bottom of the tank contents as well as throughout the area of the tank.

It will be evident that it is not economical to utilize the fertilizer as soon as it is produced and it may be desirable to accumulate it over a considerable period of time, such as several weeks or even several months, before the fertilizer is used. Consequently, it is necessary that the capacity of such a mixing and storage tank be large, yet it is also desirable to be able to mix the fertilizer in the tank and maintain it mixed uniformly with a minimum amount of expense both in construction of the equipment and in its operation. If a large square or rectangular tank is provided, it is difficult to insure that the liquid in the tank corners is mixed, and if a central stirring device is provided, it is also difficult to insure that the material in the precise central portion of the tank is properly mixed. If the tank is of circular shape, on the other hand, the portion of the liquid at the extreme periphery and also at the center may not be mixed thoroughly with the liquid in the rest of the tank and it is entirely possible that the liquid between the center and periphery is merely circulated instead of being mixed sufficiently.

If a narrow tank is provided for the purpose of insuring thorough mixing from side-to-side of the tank, it is necessary to make the tank of considerable length in order to provide capacity equivalent to a circular or square tank and such elongated shape would normally require several mixing stations distributed along the length of the tank which would increase the initial and operating cost of the mixing equipment.

Another object is to provide a mixing process for liquid manure of large capacity in which the ingredients of such manure can be mixed thoroughly and kept in a substantially homogeneous condition without sedimentation or the formation of scum for an extended period of time by the use of compact and inexpensive impeller mechanism which is economical to operate.

In accomplishing the objects mentioned above, an elongated mixing and storage tank is utilized in which is installed a combination of divider walls extending lengthwise of the tank and one or more mixing and circulating impellers, each received in a gap in a divider wall which is not appreciably wider than the diameter of the orbit in which the impeller paddles travel. Preferably such tank is located so that it can be used as a direct receiver for liquid and solid stock fertilizer, such as by use of its top or the adjacent area for a feeding or milking station, a holding pen or a poultry house. If desired, the manure accumulating area can be sloped toward an entrance or passage to the storage tank into which the manure can be sluiced and drained, or a system of collection troughs can be provided for receiving the manure, which can either be flushed periodically with water or can provide a body of water into which the manure will fall. Periodically such troughs can be drained into the storage tank.

FIGURE 1 is a plan of an underground liquid fertilizer mixing and storage tank, and FIGURE 2 is a vertical section through such tank taken on line 2—2 of FIGURE 1.

FIGURE 3 is a fragmentary top perspective of a liquid fertilizer mixing and circulating impeller and divider wall installation showing the impeller in one rotative relationship to the divider wall gap in which it is installed, and FIGURE 4 is a similar view showing the impeller in a different rotative relationship to such divider wall gap.

FIGURE 5 is a horizontal section through the mixing and storage tank taken on line 5—5 of FIGURE 2.

FIGURE 6 is a horizontal section through a modified type of liquid fertilizer mixing and storage tank which is much longer in proportion to its width than the tank shown in FIGURES 1 and 5.

FIGURE 7 is a plan with parts broken away of still a different type of liquid fertilizer mixing and storage tank construction which may be of much greater capacity than the tank shown in FIGURE 6, such as three times as three times as great.

FIGURE 8 is a horizontal section through a storage tank having a different baffle arrangement and FIGURE 9 is a horizontal section through a longer tank having a comparable baffle arrangement. FIGURE 10 is a plan of a much larger tank on a reduced scale, including a plurality of compartments each similar to the tank shown in FIGURE 9, parts of such tank being broken away.

FIGURE 11 is a plan of a manure accumulating area and associated storage tank, parts being broken away, and FIGURE 12 is a vertical section through the installation of FIGURE 11 on line 12—12. FIGURE 13 is a detail section on line 13—13 of FIGURE 11, and FIGURE 14 is a detail section on line 14—14 of FIGURE 11. FIGURE 15 is a fragmentary detail plan on line 15—15 of FIGURE 14.

Figure 16:
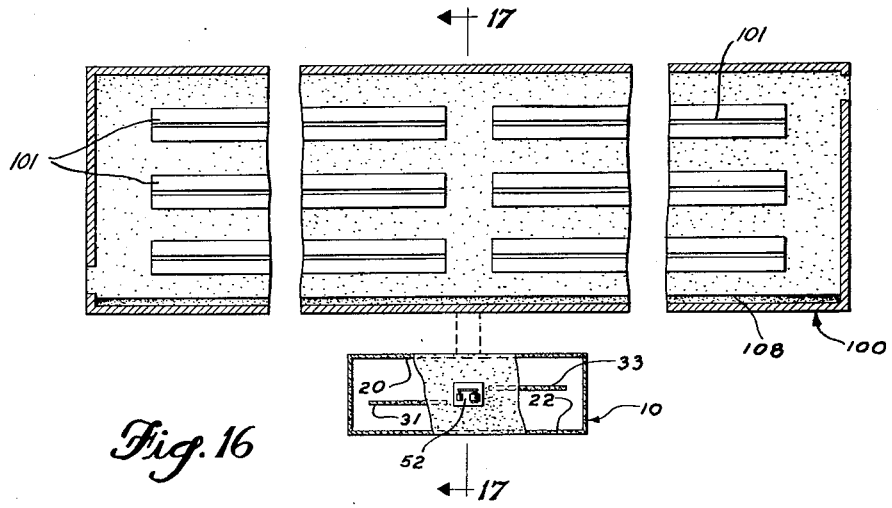
Figure 17:
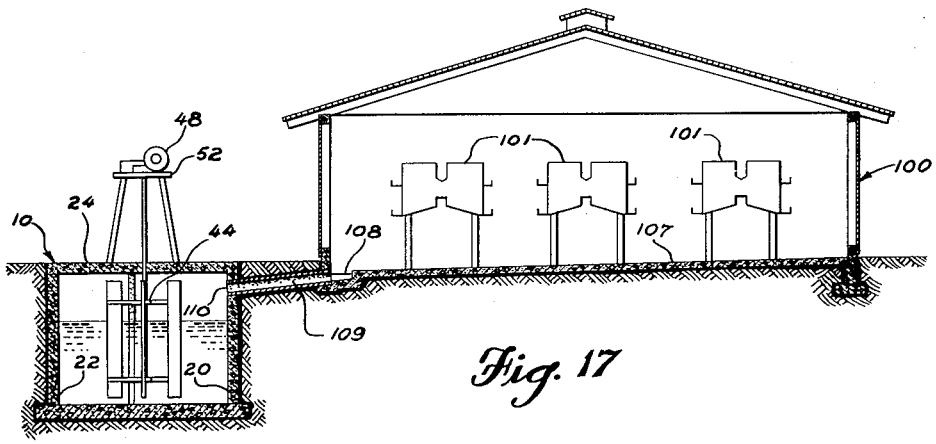

FIGURE 16 is a plan of a different type of manure accumulating area for fowl, parts being broken away, and FIGURE 17 is a vertical section on line 17—17 of FIGURE 16.

The manure accumulating area in connection with which the present invention is used may be of various sizes, shapes and types. In FIGURE 1 the manure accumulating area is illustrated as being a concrete slab serving as a milking station for cows or a feeding station for cattle, pigs, sheep or other animals. In FIGURE 10 a similar accumulating area is disclosed. FIGURES 11, 12, 13, 16 and 17 illustrate the manure accumulating area as being the floor or in the floor of housing for fowl, such as a chicken house. The arrangement of FIGURES 11, 12 and 13 is particularly suited for a chicken house in which the chicken are always confined in elongated cages.

In conjunction with such manure accumulating areas it is entirely practical to provide a liquid manure mixing and storage tank 10 of large capacity in which liquid manure can be mixed thoroughly and held in generally homogeneous condition without great difficulty for an extended period of time. The tank 10 preferably is of the underground type as shown in FIGURES 1 and 2, and it is elongated so that the opposite side walls 20 and 22 are of a length a plurality of times as great as the length of the end walls 14 and 16, as shown in FIGURE 5. The length of the side walls, for example, may be three times as great as the length of the end walls. The capacity of the tank may also be augmented by making the depth of the tank walls 14, 16, 20 and 22 between the bottom 18 and the top 24 greater than the width of the tank between the walls 20 and 22, although there is no critical relationship between the width and depth of the tank.

In order to enable the mixing and storage tank 10 to be used as a direct receiver of liquid and solid manure from livestock, the top 24 of the tank can be used as part of a feeding pen, milking area or holding pen. Provision can be made for flow of liquid manure directly into the tank 10 through suitable access openings in its top 24 and solid excreta can be scraped or washed by hose jets through such access openings. The additional water used for such washing purposes is not detrimental because it would normally be desirable to dilute the manure with a substantial amount of water anyway to serve as a vehicle. An access opening 26 in the top 24 of the tank, which is normally closed by the cover 28, can be provided through which liquid manure can be pumped from the tank 10 at will for use as fertilizer. The opening 26 also can be used for supplying water, urine, manure and commercial fertilizer in desired quantities and proportions to the tank. It is not necessary for such material to be supplied to the tank at distributed locations because an effective mixing action is accomplished in the tank.

On first consideration, it would seem that the problem of obtaining thorough and effective mixing of the contents of an elongated tank would be difficult and require a large amount of mixing equipment for a big tank. If the tank is narrow, however, a good mixing action across the width of the tank at any selected location is not difficult. The problem of obtaining effective and uniform mixing throughout the length of the tank has been solved by utilizing divider walls and impeller means in combination so as to accomplish both a local mixing action and a definite and controlled, though slow, circulatory current of the liquid manure in which the solid wastes remain suspended throughout the length of the tank. This combination includes the divider walls 32, shown as being disposed in coplanar alignment extending lengthwise of the tank, which walls are interrupted to provide a gap 34 between spaced apart wall ends in which impeller means are installed. If the tank is not too long, a single gap and impeller means will be sufficient. The divider walls 32 stop short of the end walls 14 and 16 of the tank 10 to provide narrow passages between the end walls of the tank and the adjacent ends 38 of the divider walls 32. As shown in FIGURE 2, such divider walls extend at least throughout the greater portion of the depth, and preferably the full depth, of the tank from the bottom 18 to the top 24, and midway between side walls 20 and 22.

The impeller means preferably is of the paddle rotor type 44, shown best in FIGURES 2, 3 and 4, which rotor is driven by a motor 48 mounted above the top 24 of the tank, as shown in FIGURE 1. This motor drives a speed reducer 58 by a connecting belt, which speed reducer in turn rotates the central mounting shaft 60 of the impeller rotor. The impeller rotor includes elongated upright paddles conveniently formed as wooden blades having their principal faces disposed respectively in radial planes of the rotor.

Preferably two pairs of such blades are located different distances from the rotor's axis of rotation defined by the shaft 60, arms of unequal length disposed mutually perpendicular connecting the opposite blades of each pair respectively, as shown in FIGURES 3, 4 and 5. Thus, the paddles 61 of the rotor are located a considerably greater radial distance from the rotor's axis than the opposite paddles 62. In fact, the orbit of the outer edges of paddles 62 may coincide approximately with the orbit of the inner edges of paddles 61. All of these paddles 61 and 62 are mounted on upper arms 65 and lower arms 66 extending radially of the rotor. The upper arms 65 have their inner ends secured to a mounting disk 68 and the lower arms 66 have their inner ends secured to a mounting disk 70 in any suitable fashion, such as by welding. These disks 68 and 70 may in turn be bolted to hub flanges 72 and 74, respectively, mounted on the rotor shaft 60.

In FIGURES 3, 4 and 5, the impeller is mounted with its axis coplanar with the divider walls 32 and centrally of the gap 34 in such walls. FIGURE 4 shows that the gap 34 is of a width just sufficiently greater than the diameter of the impeller's orbit formed by rotary movement of the outer edges of blades 61 to afford reasonable clearance between such blade edges and the wall gap sides as the impeller rotates. To prevent accumulation of material in the bottom of the tank at the location of the impeller's axis, it is preferred that the impeller be suspended in cantilever fashion from the top 24 of the tank 10, as shown in FIGURE 2. Mounting of the impeller rotor in this fashion is entirely practical because the rotor will not be turned sufficiently rapidly to produce any appreciable whip in the shaft, the rotative speed of the rotor preferably being only about 20 revolutions per minute.

As shown best in FIGURE 2, the tank 10 is quite deep, preferably being approximately as deep as the width of the tank. The upright paddles 61 and 62 of the rotor are each of a length extending the greater portion of the tank depth as shown in this figure with their lower ends adjacent to the bottom of the tank. The upper ends of the paddles will extend at least substantially to, and usually above, the surface of the liquid manure in the tank so that such paddles will act on the liquid from top to bottom as the rotor rotates.

The combination of the divider walls 32 and the impeller mounted in the gap of such walls produces two principal effects. One of these effects is a local mixing action of the solid wastes and liquid of the tank contents in the vicinity of the impeller. Because of the slow rotation of the impeller the liquid manure will not be churned substantially, thus avoiding excessive liberation of obnoxious odors. The stirring action of the impeller blades produces an effective mixing action of the liquid manure in the vicinity of the impeller because disposition of the lower ends of the blades adjacent to the bottom of the tank, and disposition of the upper ends of such blades at or above the surface of the liquid manure, will prevent settling and surface crust formation of the solid wastes. Also, disposition of the paddles at different distances from the axis of rotation of the impeller will effect contact of the impeller blades with a greater band of the liquid extending in a direction radially of the impeller's rotative axis. Local mixing of the liquid manure is also improved by the action of the impeller moving the material against the portions of the divider walls 32 adjacent to the gap 34.

The second action of the impeller rotation is to produce a circulatory flow of the liquid manure throughout the elongated tank so that every portion of the liquid in the tank passes periodically through the zone of action of the impeller to be mixed. To effect such circulatory flow in the tank the maximum diameter of the impeller orbit should be sufficiently great with respect to the width of the tank 10 between its opposite longitudinal walls 20 and 22 so that at least the outer blades 61 of the rotor will induce such circulatory flow of the liquid manure lengthwise of the tank at opposite sides of the divider walls 32. To produce this effect the diameter of the impeller is shown as being approximately one-half the width of the tank 10. The divider walls disposed generally centrally between the longitudinal walls of the tank prevent the liquid from moving merely in a local whirl and force the liquid to travel lengthwise of the tank.

The path of the circulatory flow lengthwise of the tank thus produced by the impeller is indicated by the arrows in FIGURE 5. As the liquid currents approach the opposite ends of the tank at the opposite sides of the divider walls 32, they will, of course, be deflected by the tank ends 14 and 16 and be compelled to move through the passages between the ends 38 of the divider walls and the tank end walls. Because the tank is narrow and these passages are narrow, the currents will sweep through the corners of the tank and along the end walls to maintain circulation throughout the entire tank and avoid the formation of stagnant areas.

As the general circulatory flow of the material in the tank in this fashion passes the location of the impeller 44 at each side of the divider walls 32, a portion of the liquid directly in the path of the impeller blades will be deflected from the general path of liquid movement and subjected to the local mixing action described above. This local mixing action of successive portions of the circulating tank liquid by the impeller will soon produce homogeneity of the entire body of liquid in the tank by causing soluble solids to dissolve and insoluble soft solids to be suspended uniformly. Thereafter the combined local mixing and general circulatory movement of the liquid in the tank effected by the impeller will maintain substantial homogeneity of the liquid even though, after homogeneity is once achieved, the speed of rotation of the impeller is reduced, or the impeller is operated only intermittently, but at sufficiently frequent intervals to prevent sedimentation or the formation of scum in any portion of the tank.

When a single impeller is provided in a liquid manure mixing and storage tank, as shown in FIGURE 5, it is not necessary that such impeller be located centrally between the ends of such tank as shown in FIGURE 5, but the action of the impeller is most effective when placed at this location because the propulsion effect of the impeller on the liquid to move it toward opposite ends of the tank is equalized. Consequently, the impeller will be capable of effecting and maintaining a homogeneous mixture of the solid wastes in the liquid in the longest tank in which only one impeller will be effective. It has been found that in such an installation it is entirely practical for the tank to be approximately three times as long as it is wide.

If a tank of appreciably larger capacity is required, it is more feasible to increase the length of the tank, such as the tank 70 in FIGURE 6, to increase the length of the divider walls 32 correspondingly, and to provide two gaps 34 and 36 in such walls in which impellers 44 are installed. Such an arrangement is more effective than increasing the width of the tank 10 and correspondingly increasing the diameter of the impeller. The tank 70 is of a length approximately six times as great as its width and the impellers 44 are mounted at locations approximately one-quarter of the length of the tank from its opposite end walls 14' and 16'. The width of the tank between the walls 20' and 22' may be approximately the same as the width of the shorter tank shown in FIGURE 5. Correspondingly, the diameters of the impellers 44 in the tank of FIGURE 6 may be the same as the diameter of the impeller 44 in the tank of FIGURE 5.

In the installation of FIGURE 6, the two impellers 44 will cooperate in inducing and maintaining the general circulatory flow of the liquid manure through the longitudinal channels of the tank at opposite sides of the divider walls 32 by rotating the impeller rotors in the same direction. In this instance, each impeller will produce a local mixing action in its wall gap 34 or 36, contributing to the production of homogeneity of the solid wastes in the liquid in the tank in the manner described in connection with the installation of FIGURE 5. After the homogeneity of the liquid has been obtained, the speed of rotation of both impellers may be reduced, or the impellers may be operated intermittently. In the latter case it is preferable that the impellers be operated alternately, which will provide some circulatory impulsion in one end portion of the tank or in the other when either of the impellers is in operation, the end in which the circulation is greater depending upon which impeller is operating.

Because after the contents of the tank 70 have been mixed thoroughly to a homogeneous condition it is not necessary to operate both impellers 44 continuously as required to establish such homogeneity initially, it is feasible to provide a tank structure of much greater capacity without correspondingly increasing the expense either of initial construction or of operation as far as the impellers are concerned. Thus, in FIGURE 7, a tank 80 is shown having three compartments 81, 82 and 83, respectively, in side-by-side relationship, each of which compartments is of a size and shape approximately the same as tank 70 shown in FIGURE 6. Compartments 81 and 82 are separated by a common wall 84 and compartments 82 and 83 are separated by a common wall 85. Each of these compartments thus forms, in effect, a separate mixing and storage tank to which access is afforded through the hatches 86, 87 and 88, respectively.

Economy of impeller installation is afforded by installing on the top 89 of the composite tank two sets of tracks 90 extending transversely of the tank at locations approximately one-quarter of the length of the tank from the respective ends of the tank. On each of these sets of tracks is mounted a carriage 91 carrying an impeller 44. At the locations of the tracks the common walls 84 and 85 have in them passageways closable by gates 92 which are removable. In each of the compartments 81, 82 and 83 are divider walls 32 extending lengthwise of the compartments as previously described, having gaps 34 in them in registry transversely of the tank compartments with the tracks 90 and the passages closed by gates 92. These gaps are, of course, of a width corresponding to the diameter of the orbit of the impellers 44 as previously described.

To enable the impellers 44 to be shifted from one of the compartments 81, 82 and 83 of tank 80 to another of such compartments, it is only necessary that a slot 93 be provided in the tank top 89 between and parallel to the tracks of each pair of tracks 90. The width of each such slot must be great enough to allow an impeller shaft 60 to be slid along it. Following such movement of the impeller shaft the slot can be covered by a suitable cover 94.

When the gates 92 are in position closing the passageways between the tank compartments 81, 82 and 83, each of such compartments is, in effect, a separate tank. In FIGURE 7, the carriages 91 and impellers 44 are disposed in the central compartment 82 and both of these impellers can be operated to mix and circulate the contents of this compartment to produce homogeneity of the liquid in it as described in connection with the tank shown in FIGURE 6. If the liquid manure in an adjacent tank 81 or 83 needs mixing, the appropriate gates 92 can be removed to open the passageways between the compartment 82 and such an adjacent compartment.

While it is desirable for the level of the liquid in two compartments thus placed in communication by removal of the gates 92 between them to have been approximately the same when the gates were removed, this is not necessary. If the liquid level is virtually the same there would be no apreciable flow from one compartment into the other, but even if some flow did occur, it would probably be insufficient to alter appreciably the character of the liquid in either compartment of the tank as a whole after it had been rendered homogeneous by the mixing action described above. Any such flow would, of course, tend to equalize the levels of the liquids of the two compartments.

When the gates 92 between two adjacent compartments have thus been opened or removed the impeller carriages can be shifted along the tracks 90 to move the impellers from one compartment into the adjacent compartment. It is desirable that the impellers be thus moved into a compartment into which manure is to be supplied before such manure supplying operation is begun, so that any flow which occurs between adjacent compartments in the manner described above will be of material which has been rendered substantially homogeneous by a mixing and circulating operation.

After the impeller carriages have been shifted into the adjacent compartment in the manner described, the gates 92 can be replaced and the mixing and circulating action accomplished in this compartment by the operation of the impellers 44. Additional manure can be supplied to such compartment during the mixing operation, if desired, but, in any event, after any additional manure has been supplied the impellers should be rotated for a time sufficient to insure substantial homogeneity of the manure in such compartment before the impellers are shifted into a different compartment in the manner described. The important feature of the installation shown in FIGURE 7 is that, by provision of only two impeller assemblies, it is quite practical to provide a liquid mixing and storage tank having a capacity three times the capacity of that shown in FIGURE 6, which also requires two impellers.

While the combination of impellers 44 and divider walls 32 located midway between the long walls 20 and 22, or 20' and 22' of an elongated tank, as shown in FIGURES 5 and 6, provides a satisfactory mixing and circulation of the liquid manure in the tanks, a more effective operation is obtained by arranging the divider walls in the tank 10, 70 or 80 in the manner shown in FIGURES 8, 9 and 10, instead of as shown in FIGURES 5, 6 and 7. In each of the installations shown in FIGURES 8, 9 and 10 the ends of the divider walls adjacent to the impeller 44 are offset so that a line joining them is not parallel to the longitudinal walls of the tank. At least one divider wall end adjacent to the impeller will be offset from the center of the tank and the spacing between such divider wall end and the opposite sides of the tank will be different from the spacing between the divider wall end at the opposite side of the impeller and the longitudinal walls of the tank.

In FIGURE 8 the rotative axis of the impeller 44 is located midway between the opposite longitudinal walls 20 and 22 of the tank 10. The end of divider wall 31 adjacent to the impeller is located closer to the tank wall 20 than to the tank wall 22 and, conversely, the end adjacent to the impeller of the divider wall 33 on the opposite side of the impeller 44 is located closer to tank wall 22 than it is to tank wall 20. Consequently, a line extending through the gap 35 between the adjacent ends of walls 31 and 33 will not be parallel to the tank walls 20 and 22. Such line will, however, pass through the rotative axis of the impeller 44 because such axis is centered between the walls 20 and 22 of the tank and the divider wall 31 is shown as being offset toward the wall 20 from the center of the tank a distance equal to the offset of divider wall 33 from the center of the tank toward tank wall 22. Such disposition of the rotor causes its blades 61 to engage more effectively liquid manure moving toward the impeller and to accelerate such liquid lengthwise of the tank and reduces the tendency for the blades 61 to move such liquid through the gap 35. Moreover, the accelerated liquid is passing at higher velocity into a smaller passage than that through which it approached the impeller.

In FIGURE 9 the central divider wall 32 is located midway between the opposite longitudinal walls 20' and 22' of the elongated tank 70 and is approximately twice as long as the divider wall 31', or the divider wall 33', at opposite ends of the tank. The divider wall 31' is offset from the center of the tank toward the longitudinal wall 20' and the divider wall 33' at the opposite end of the tank is offset in the opposite direction toward the longitudinal wall 22' from the center of the tank. While the axes of rotation of the impellers 44 in the divider wall gap 35' between divider wall 31' and divider wall 32, and in the gap 37 between divider wall 32 and divider wall 33', are located midway between the opposite longitudinal walls 20' and 22' of the tank, it would be appropriate to locate the impeller in the divider wall gap 35' so that its axis of rotation is somewhat closer to the longitudinal tank wall 20' than to the longitudinal tank wall 22' and to locate the impeller 44 in the divider wall gap 37 so that its axis of rotation is somewhat closer to the longitudinal tank wall 22' than to the longitudinal tank wall 20'. In general, however, the effect of the arrangement shown in FIGURE 9 is similar to the effect of arranging the divider walls 31 and 33 of FIGURE 8 in positions somewhat offset from the center of tank 10, as discussed above.

In the tank 80 of FIGURE 10 the three compartments 81, 82 and 83 of the tank 80 are the same as the compartments in the tank 80 shown in FIGURE 7. Also, the impellers 44 and the arrangements for mounting them are the same. The difference in the installation of FIGURE 10 over that of FIGURE 7 is simply that the divider walls in the tank compartments are offset in the same manner as in the tank 70 shown in FIGURE 9 and the divider wall sections have been numbered correspondingly. Consequently, the mixing and circulatory action in each of the compartments 81, 82 and 83 will be the same as in the tank 70 of such figure.

The liquid manure storage tanks described above can be utilized in combination with various types of manure accumulating areas. In FIGURES 1, 7 and 10 the manure accumulating area is illustrated as being the concrete slab top of the liquid sewage receiving and storage tank. Such tanks are shown as being utilized in connection with fowl cage installations in FIGURES 11 to 17, inclusive. The fowl house is shown offset from the liquid manure storage tank 10 and the liquid manure is accumulated in the fowl house and conveyed to the liquid manure storage tank periodically, such as once each week. The construction of tank 10 in FIGURES 11 and 12 is the same as such tank shown in FIGURE 8 and consequently further description of the tank here is unnecessary.

The poultry house may be used for housing different kinds of fowl such as chickens or turkeys, and the construction of the poultry houses 100 and elongated cages 101 within the house shown in FIGURE 12 are conventional. The bottoms of such cages are made of wire netting so that excreta, feathers, waste feed and other refuse will fall from the cages to keep them clean. In the construction shown in FIGURES 11, 12 and 13 troughs 102 are provided in the floor 103 of the poultry house which are elongated lengthwise of such house and located beneath the respective elongated cages 101. Refuse dropped from such cages will therefore fall into these troughs instead of simply falling on the floor.

The manure accumulating or collecting troughs 102 are shown in FIGURE 11 as having their lengths arranged in parallel relationship and parallel to the length of the poultry house 100. The bottoms of such troughs slope toward a common transfer trough 104 in the center of the poultry house 100. Such transfer trough is elongated transversely of the lengths of troughs 102 and the house and slopes toward the underground liquid manure storage tank 10 alongside the house, as shown in FIGURES 11 and 12, with which it communicates through an opening 105 in the side of the storage tank. Water may be retained to a desired depth in each of the collecting troughs 102 by closing a control gate 106 in its end portion adjacent to the trough 104. If the waste material from the cages drops into water rather than simply onto the floor 103, or into an empty trough 102, the dust and odor will be reduced and nuisance of flies virtually eliminated.

When it is desired to clean the poultry house the wing nuts 107 on the bolts holding the control gates 106 closed, as shown in FIGURE 15, can be loosened and the gates slid upward sufficiently to enable the contents of collecting troughs 102 to be emptied into the common trough 104. The wing nut 107 can then be tightened to hold the gate in raised position. If there has been a substantial amount of water in each of the troughs 102 such water will flow into the trough 104 and carry with it the waste material which has dropped into the particular trough 102. Water from a hose can then be used to wash out the trough 102 and sluice into trough 104 any residue of waste material which there may be in each trough 102. If water has been allowed to stand in the trough to receive the waste material from the fowl cage above it, it will be much easier to sluice any remaining material from the trough 102 into the trough 104, but, if desired, each trough 102 may be left empty and the solid waste material simply sluiced by water supplied at cleaning time into the trough 104. By handling the cleaning in this manner much less water will accompany the solid waste material deposited in the storage tank 10 so that the liquid manure will be more concentrated.

It is not necessary to provide manure-collecting troughs for poultry houses as described in connection with FIGURES 11 to 15, inclusive; although this type of construction is preferable. In FIGURES 16 and 17 a poultry house 100 and associated liquid manure underground storage tank 10 are shown, but in this instance the fowl cages 101 do not have waste material collecting troughs beneath them. Instead, the poultry house floor 107 slopes toward a single liquid manure collecting trough 108 at the side of the house adjacent to the storage tank 10. Waste material from the cages 101 in this instance will simply drop onto the floor 107 and periodically, for example once each week, all of the debris and manure can be sluiced from the floor into the side collecting trough 108. This trough slopes from the opposite ends of the poultry house toward a central transfer trough or conduit 109 extending transversely of the trough 108 to the storage tank. Such transfer trough or conduit communicates with an aperture 110 in the wall 20 of the storage tank through which the liquid manure and other waste material can enter the storage tank.

I claim as my invention:

1. The process of mixing and storing liquid manure containing solid waste material in suspension without substantial churning, which comprises collecting such liquid manure in a horizontally elongated tank having divider wall means extending lengthwise therein, and orbitally stirring such liquid over substantially its entire depth at a selected location fixed lengthwise of the tank and thereby propelling such liquid manure directly horizontally gently lengthwise of the tank over substantially its entire depth in an elongated endless path in opposite directions along opposite sides of the divider wall means and at opposite sides of such selected location lengthwise of the tank and thereby maintaining in suspension insoluble solid waste material components of the liquid manure.

2. The process of mixing and storing liquid manure containing solid waste material in suspension without substantial churning, which comprises confining such liquid manure in a horizontally elongated body, stirring such liquid over substantially its entire depth at a selected location between the ends of the elongated liquid body and thereby propelling such liquid manure gently lengthwise of the tank over substantially its entire depth in an elongated endless path in opposite directions, and during such propelling of such liquid manure separating the flow lengthwise of the body between the opposite long sides of the body throughout most of the length of the body and at opposite sides of such selected location lengthwise of the body of liquid and thereby maintaining in suspension insoluble solid waste material components of the liquid manure.

References Cited by the Examiner

FOREIGN PATENTS 147,736    6/1931    Switzerland.
238,478   11/1945    Switzerland.

WALTER A. SCHEEL, *Primary Examiner.*

CHARLES A. WILLMUTH, *Examiner.*